US010196320B2

(12) United States Patent
Skowronek et al.

(10) Patent No.: US 10,196,320 B2
(45) Date of Patent: Feb. 5, 2019

(54) PLANT FOOD, NUTRIENT AND SOIL CONDITIONER FORMULATION

(71) Applicant: Max Wellness Argo Sp. z.o.o., Warsaw (PL)

(72) Inventors: Daniel Skowronek, Lowicz (PL); Zygmunt Brogowski, Lowicz (PL)

(73) Assignee: Max Wellness Argo Sp. z.o.o., Warsaw (PL)

( * ) Notice: Subject to any disclaimer, the term of this patent is extended or adjusted under 35 U.S.C. 154(b) by 429 days.

(21) Appl. No.: 14/737,024

(22) Filed: Jun. 11, 2015

(65) Prior Publication Data

US 2015/0361005 A1    Dec. 17, 2015

Related U.S. Application Data

(60) Provisional application No. 62/010,512, filed on Jun. 11, 2014.

(51) Int. Cl.
| | | |
|---|---|---|
| *C05F 11/02* | (2006.01) | |
| *C05G 3/04* | (2006.01) | |
| *C05D 9/02* | (2006.01) | |
| *C05F 11/00* | (2006.01) | |

(52) U.S. Cl.
CPC .............. *C05F 11/02* (2013.01); *C05D 9/02* (2013.01); *C05F 11/00* (2013.01); *C05G 3/04* (2013.01)

(58) Field of Classification Search
None
See application file for complete search history.

(56) References Cited

U.S. PATENT DOCUMENTS

| | | | | |
|---|---|---|---|---|
| 2,570,537 | A * | 10/1951 | Finch ...................... | C05F 11/00 405/264 |
| 4,174,957 | A * | 11/1979 | Webb .................. | A01G 9/1086 71/24 |
| 4,249,929 | A * | 2/1981 | Kneer ...................... | C05F 7/00 210/609 |
| 4,743,287 | A * | 5/1988 | Robinson ................. | C05F 3/00 71/12 |
| 5,393,317 | A * | 2/1995 | Robinson ................. | C05F 3/00 71/12 |
| 5,466,273 | A * | 11/1995 | Connell .................... | C05F 3/00 71/11 |
| 5,603,744 | A * | 2/1997 | K urner .................. | C05B 17/00 71/13 |
| 5,698,001 | A * | 12/1997 | Keenportz ............... | C05D 9/00 71/24 |
| 5,876,479 | A * | 3/1999 | Hedgpeth, IV .......... | C05D 3/02 71/11 |

(Continued)

FOREIGN PATENT DOCUMENTS

| | | | |
|---|---|---|---|
| EP | 0298136 | * | 1/1989 |
| EP | 0472771 | * | 3/1992 |

(Continued)

*Primary Examiner* — Wayne A Langel
(74) *Attorney, Agent, or Firm* — McHale & Slavin, P.A.

(57) ABSTRACT

The present invention describes a plant growth and soil enhancement formulation, and method of using said formulation for enhanced plant growth and soil enrichment, comprising generally an organic substance such as humus and at least one mineral, preferably a bedrock material known as Geza.

9 Claims, 7 Drawing Sheets
(7 of 7 Drawing Sheet(s) Filed in Color)

(56) References Cited

U.S. PATENT DOCUMENTS

| | | | |
|---|---|---|---|
| 6,447,568 B1 * | 9/2002 | Shiiba | C05F 17/0036 71/11 |
| 6,783,567 B1 * | 8/2004 | Waters | C05D 9/00 71/24 |
| 7,811,352 B2 | 10/2010 | Binder et al. | |
| 8,110,017 B2 | 2/2012 | Wells | |
| 8,465,567 B2 * | 6/2013 | Bottcher | C05D 9/00 71/10 |
| 8,617,283 B2 * | 12/2013 | Mora | C05D 3/02 71/23 |
| 8,911,525 B1 * | 12/2014 | Ward | A01G 31/001 71/24 |
| 2003/0131641 A1 * | 7/2003 | Shulgin | B01D 57/02 71/24 |
| 2011/0077155 A1 * | 3/2011 | Goodwin | A01N 25/08 504/101 |
| 2011/0214465 A1 | 9/2011 | Peacock et al. | |
| 2011/0247273 A1 * | 10/2011 | Cannock | C05D 3/00 47/1.01 R |
| 2012/0222170 A1 | 8/2012 | King et al. | |
| 2013/0145805 A1 * | 6/2013 | Olson | C05D 9/00 71/6 |
| 2014/0360238 A1 * | 12/2014 | Ward | A01G 31/001 71/24 |
| 2015/0203414 A1 * | 7/2015 | Cook | C05D 9/00 71/7 |
| 2016/0102028 A1 * | 4/2016 | Lee | C05G 3/0047 71/24 |

FOREIGN PATENT DOCUMENTS

| | | |
|---|---|---|
| FR | 2689723 | * 10/1993 |
| WO | 2013/159709 | * 10/2013 |

* cited by examiner

PLANT FOOD, NUTRIENT AND SOIL CONDITIONER FORMULATION

CROSS REFERENCE TO RELATED APPLICATIONS

In accordance with 37 CFR 1.76, a claim of priority is included in an Application Data Sheet filed concurrently herewith. Accordingly, the present invention claims priority to U.S. Provisional Patent Application Ser. No. 62/010,512, entitled, "Plant Food, Nutrient and Soil Conditioner Formulation", filed Jun. 11, 2014. The contents of the above referenced application are incorporated herein by reference in its entirety.

FIELD OF THE INVENTION

The present invention is directed to an agricultural product; to a formulation for plants which augments growth by enhancing root activity and soil stability; and more particularly to a plant growth and soil enhancement formulation formulated to act as a plant food, nutrient, and soil conditioner which does not require the use of chemical fertilizers, pesticides, herbicides or fungicides.

BACKGROUND OF THE INVENTION

The agricultural industry is a multi-billion dollar industry crossing all continents with the general aim of improving crop production. Crop production, whether for food or industrial use, is vital to the sustainability to human existence. As such, numerous governmental agencies, private companies, universities, and trade associations have been established to provide products, training, and information regarding crop technology in order to improve the profitability of the agriculture industry. The ability of society to produce various crops, particularly food related crops, faces several serious challenges. First, as the world population expands, the pressure to feed additional populations increases. Moreover, in many parts of the world, individuals are living longer. The amount of arable land relative to the increasing population is decreasing. In order to feed the world population and satisfy crop yield for industrial uses, numerous crop protecting substances, such as pesticides, herbicides, fungicides, or bio-engineered crops, have been developed to improve crop production. While these substances have been vital in increasing crop yields by controlling weed growth, effects of insects and plant-based pathogens and disease, use of these substances are not without controversy, including claims that such substances are harmful to humans, harmful to the environment, and particularly for bio-engineered crops, are harmful to the overall food chain.

Additional means of increasing crop production have been accomplished through the use of fertilizers. Fertilizers, whether organic, i.e. composed of organic plant or animal matter, or inorganic, are generally designed to supply different nutrients (such as macronutrients including nitrogen, phosphorous, potassium, calcium, magnesium, and sulfur, micronutrients such as boron, chlorine, copper, iron, manganese, molybdenum, zinc, and nickel, to plants to aid in plant growth. The nutrients provided by the fertilizer then get absorbed into the plant. Numerous fertilizers and methods of making fertilizers are known in the art. Illustrative examples include U.S. Pat. No. 8,110,017, U.S. Pat. No. 7,811,352, U.S. Patent Application Publication No. 2012/0222170, and U.S. Patent Application Publication No. 2011/02144465. While fertilizers are vital to increasing crop production, they are not without their own problems. Inorganic fertilizers have been known to contribute to water pollution, soil acidification, or trace mineral depletion.

Given the increased pressures on crop production, what is needed in the art is an improved crop enhancing substance, preferably a plant growth and soil enhancement formulation, in order to maintain adequate crop supplies for both food production and industrial use.

SUMMARY OF THE INVENTION

The present invention describes a plant growth and soil enhancement formulation comprising generally humus and at least one mineral, preferably a bedrock material known as Geza. The use of the Geza in the formulation contributes to the formulation having strong binding properties to both anions and cations, thereby allowing nutrients to remain in the soil level, be accessible to the plant, and prevent the plant from absorbing heavy metals. The presence of this mineral in the plant growth and soil enhancement formulation contributes to making phosphorus contained in the soil available to the plant. The presence of the mineral also contributes to the prevention of crop lodging and minimizes harmful effects of mobile aluminum contained in the soil, which poisons and destroys plant root system.

The plant growth and soil enhancement formulation may further include other components, such as microorganisms including beneficiary saprophytic bacteria or fungi. The microorganisms provide the plant sources of nitrogen, phosphorus and sulfur. One or more micro-elements which are essential for plants, such as iron, manganese, zinc, copper, boron, molybdenum, and other micro-elements, as well as other organic components, humic compounds, and colloidal silica may be included in the formulation.

Accordingly, it is an objective of the instant invention to provide a plant growth and soil enhancement formulation.

It is a further objective of the instant invention to provide a plant growth and soil enhancement composition formulated to provide a plant with nutrients in hydroponic proportions.

It is yet another objective of the instant invention to provide an organic plant growth and soil enhancement formulation adapted to influence soil structure by increasing its water holding capacity and absorption capacity.

It is a still further objective of the invention to provide an improved organic plant growth and soil enhancement formulation adapted to prevent plants from up-taking heavy metals from the soil.

It is a further objective of the instant invention to provide an improved organic plant growth and soil enhancement formulation adapted to prevent or minimize the destruction of the root systems resulting from heavy metal uptake.

It is yet another objective of the instant invention to provide an improved organic plant growth and soil enhancement formulation adapted to prevent crop lodging.

It is a still further objective of the invention to provide an improved organic plant growth and soil enhancement formulation adapted to prevent environmental contamination in a form of washing out of phosphates into ground water.

It is a further objective of the instant invention to provide an improved organic plant growth and soil enhancement formulation adapted to enable agricultural cultivation on sand.

It is yet another objective of the instant invention to provide an improved organic plant growth and soil enhancement formulation comprising solid organic humus, in combination with a rare, nutrient rich, mineral-based material.

It is yet another objective of the instant invention to provide an improved organic plant growth and soil enhancement formulation comprising solid organic humus, in combination with a rare, nutrient rich, mineral-based material from sedimentary rock.

It is a still further objective of the invention to provide an improved organic plant growth and soil enhancement formulation comprising solid organic humus, in combination with a rare, nutrient rich, mineral-based material known as Geza.

It is a further objective of the instant invention to provide an improved organic plant growth and soil enhancement formulation comprising solid organic humus, in combination with a rare, nutrient rich, mineral-based material isolated from Geza adapted to act as a plant food, nutrient, and soil conditioner.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

The patent or application contains at least one drawing executed in color. Copies of this patent or patent application publication with color drawings will be provided by the Office upon request and payment of the necessary fee.

Figure 1:
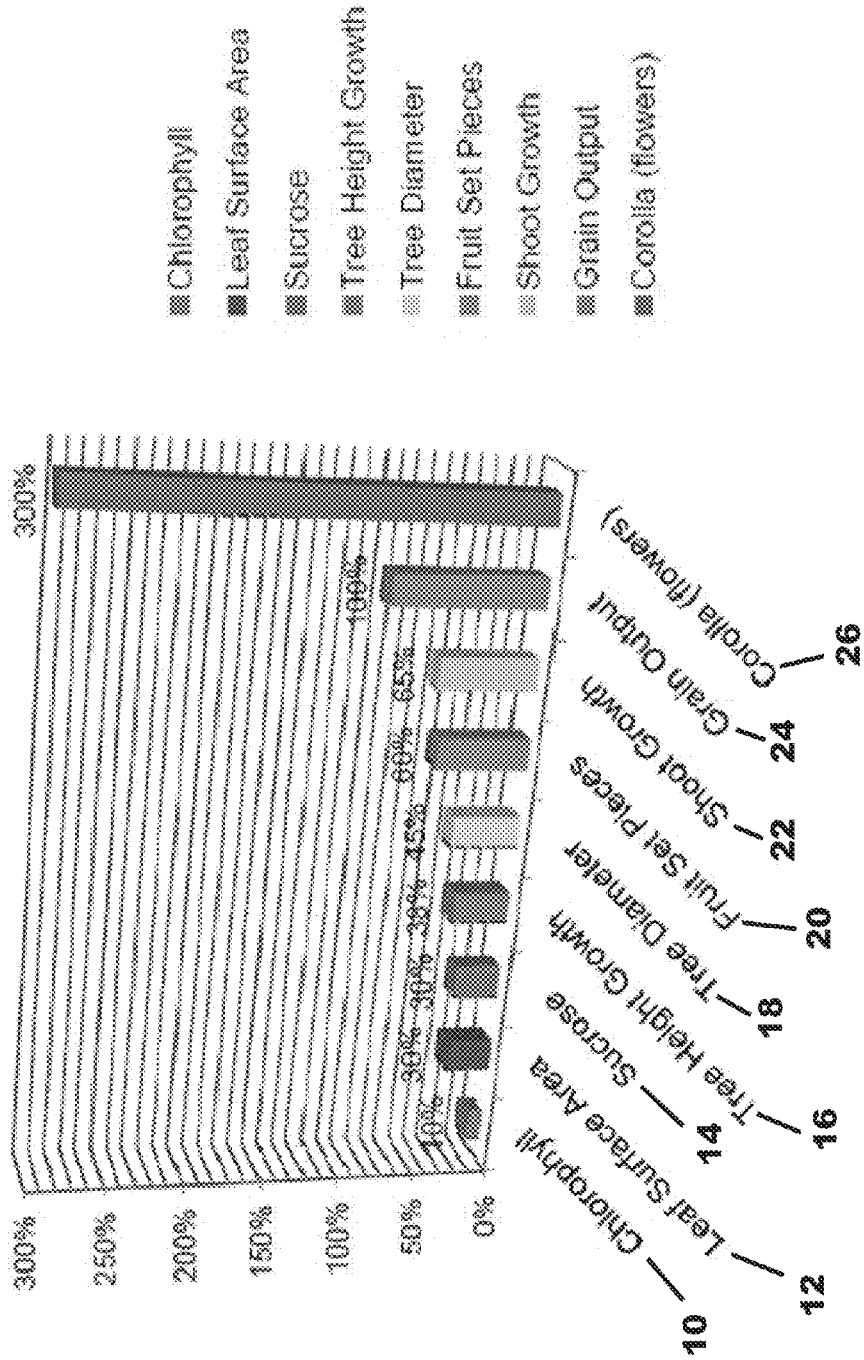
FIG. 1 is a graph illustrating the agricultural and environmental impact of applying the plant growth and soil enhancement formulation to a variety of live crops.

FIG as having carbon content of 25-35%, a high inherent moisture content (as high as 66%), and ash content ranging from 6%-19%.

In certain embodiments, the plant growth and soil enhancement formulation composition comprises humic substances, such as humic acid or fulvic acid.

In certain embodiments, the plant growth and soil enhancement formulation composition comprises sufficient amounts/concentrations of one or more mineral based substances. The minerals may include, for example, one or more members of the phyllosilicate group of minerals. The minerals typically have microscopic crystals and form a clay. As an illustrative example, the phyllosilicate group may include a clay group such as the Smectite/Montmorillonite Family. The Smectite Family of clays includes Montmorillonite and has larger cation exchange capacity and specific surface as compared to other families of clays. They have an absorption capacity as much as eight times greater than other clays. Montmorillonite is a very soft phyllosilicate group of minerals that typically form in microscopic crystals, forming a clay. Montmorillonite is a 2:1 clay having 2 tetrahedral sheets sandwiching a central octahedral sheet. The particles are plate-shaped with an average diameter of approximately one micrometer. The water content of Montmorillonite is variable and it increases greatly in volume when it absorbs water. Chemically it is hydrated sodium calcium aluminum magnesium silicate hydroxide $(Na,Ca)(Al,Mg)_6(Si_4O_{10})(OH)_6 \cdot nH_2O$.

In certain embodiments, the phyllosilicate group may be Bentonite. Bentonite is an absorbent aluminum phyllosilicate, generally impure clay consisting mostly of montmorillonite. There are different types of Bentonites, each depending on the dominant element that makes up the clay, such as potassium (K), sodium (Na), calcium (Ca), and aluminum (Al). Bentonite usually forms from weathering of volcanic ash, most often in the presence of water.

In certain embodiments, the mineral composition may include sufficient amounts/concentrations of a bedrock component. In an illustrated, albeit preferred embodiment, the bedrock component is comprised of a silica-calcite sedimentary rock known as Geza (also known as gaize or opoka). The bedrock is found primarily in Poland, Lithuania, and the Ukraine. Use of the bedrock in the formulation provides several advantages over traditional fertilizers. First, adding bedrock to the plant growth and soil enhancement formulation makes the silicon contained therein penetrate the plant's cell walls. By "lining" the cell walls with silica, the risk of mycotic diseases or getting pathogens into the plant is prevented or minimized. The silica also prevents the absorption of heavy metals by plants. Application of bedrock, together with the other components of the plant growth and soil enhancement formulation, allows for more effective activity of the plant growth and soil enhancement formulation due to the strong binding properties of the Geza. Geza applied into the soil binds both anions and cations. Binding prevents the soil anions and cations from being washed away and providing a means to getting into those layers of the soil, which are inaccessible for plants without such material.

As described later, the plant growth and soil enhancement formulation contains microorganisms therein which get released into the soil. The presence of bedrock keeps them in the soil layer accessible to be absorbed by the plant. The bedrock/Geza prevents absorption of heavy metals by plants, including mobile aluminum. It binds heavy metals into insoluble compounds making them inaccessible to the plants. Bedrock strongly affects phosphorus content in the soil. Use of the bedrock provides a mechanism which allows plants to use phosphorus. Reaction with silica converts the phosphorus from an inaccessible form to an accessible form. Therefore, use of Geza within the plant growth and soil enhancement formulation can be applied instead of fertilizing with phosphorus. The bedrock itself will release phosphorus to the soil.

Application of bedrock prevents heavy crops from lodging (for instance falling of rice ears to the water), which often results in the decrease in crop yield. Bedrock is further believed to influence mobile aluminum, known to poison and destroy the root system of a plant, in the soil by neutralizing it. Finally, use of bedrock/Geza prevents the washing away of phosphates into ground waters. Such wash away causes significant contamination of the natural environment. The bedrock is provided in sufficient form and concentration to retain phosphates and prevent them from penetrating into ground waters.

In certain embodiments, the mineral composition may include sufficient amounts/concentrations of Kieserite. Kieserite is chemically known as magnesium sulfate monohydrate, $MgSo_4\text{-}H_2O$. It is a naturally occurring mineral typically mined from geologic marine deposits.

In certain embodiments, the plant growth and soil enhancement formulation composition may comprise sedimentary rock such as lignite coal.

In certain embodiments, the plant growth and soil enhancement formulation composition may comprise sedimentary rock rich in silicon.

In certain embodiments, the plant growth and soil enhancement formulation may comprise sufficient amounts/concentrations of Lignin. Lignin, having a molecular formula such as $C_9H_{10}O_2$, $C_{10}H_{12}O_3$, $C_{11}H_{14}O_4$, is a complex chemical compound most commonly derived from wood, and an integral part of the secondary cell walls of plants and some algae.

In certain embodiments, the plant growth and soil enhancement formulation composition may comprise sufficient amounts/concentrations of one or more of sorbents, i.e. materials used to absorb liquids or gases.

In certain embodiments, the plant growth and soil enhancement formulation may comprise sufficient amounts/concentrations of one or more microorganisms such as, for example, saprophytic bacteria or fungi. The microorganisms may be naturally occurring organisms associated with one or more components of the plant growth and soil enhancement formulation, or can be microorganisms added independently or separately. The microorganisms may be cultured. Accordingly, the plant growth and soil enhancement formulation preferably contains microorganisms that prevent soil exhaustion or improve immunity and activity of the plants, or have the ability to bind nitrogen from the air. As an illustrative example, the plant growth and soil enhancement formulation may contain one or more strains of *Pseudomonas* bacteria and/or *Actinobacteria*. *Actinobacteria* are saprotrophes that accelerate the processing of hard-degradable substances including lignin, chitin, pectin, keratin and various aromatic complexes. In addition to the bacteria, the plant growth and soil enhancement formulation may contain one or more species of *Trichoderma* fungi.

In certain embodiments, the plant growth and soil enhancement formulation may contain sufficient amounts/concentrations of one or more micro-elements essential for plants, including but not limited to iron, manganese, zinc, copper, boron, molybdenum.

In certain embodiments, the plant growth and soil enhancement formulation may contain sufficient amounts/ concentrations of one or more macro-elements essential for plants, including but not limited to nitrogen, phosphorous, potassium, calcium, magnesium.

In certain embodiments, the plant growth and soil enhancement formulation may include sufficient amounts/concentrations of humic substances.

In certain embodiments, the plant growth and soil enhancement formulation may include sufficient amounts/concentrations of humic acids. Humic acid is one of two classes of natural acidic organic polymer extracted from humus found in the soil.

In certain embodiments, the plant growth and soil enhancement formulation may include sufficient amounts/concentrations of fulvic acids.

In certain embodiments, the plant growth and soil enhancement formulation composition may comprise biostimulators, phytohormones which stimulate the growth and development of plants.

In certain embodiments, the plant growth and soil enhancement formulation may include sufficient amounts/concentrations of one or more zeolites (microporousaluminosilicate crystalline structures commonly used for adsorption and ion exchange).

In certain embodiments, the plant growth and soil enhancement formulation may include sufficient amounts/concentrations of one or more alkalinizer, such as but not limited to potash, potassium lime, or sodium lime.

In certain embodiments, the plant growth and soil enhancement formulation may be formulated and/or used to grow crops in sandy soils, typically associated with desert soil structures. In such an environment, the plant growth and soil enhancement formulation may be added to the sand substances, causing adhering or joining of soil particles in clods and grains, changing its structure. The change in structure provides resistance to washout, but it also increases its sorptive capacity. By filling the gaps among sand particles, a layer is created which retains both nutrients and moisture present.

The following examples provide illustrative variations of the plant growth and soil enhancement formulation, and are not meant to be limiting. Generally, about 10 to 20 liters of the fertilizer composition maybe dissolved in 100 to 2000 L\liters of water. More specifically, about 10 to 20 liters of fertilizer may be dissolved in 200 liters of water for use with smaller plants. The same 10 to 20 liters of fertilizer may be dissolved in 500 liters of water for bigger plants, or even 1000 liters of water for orchards. The plant growth and soil enhancement formulation may be best applied to soil in the early spring at a dilution of about 50 liters of fertilizer mixed with 500 to 1000 liters of water and distributed using a machine or a device used for irrigation. The plant growth and soil enhancement formulation may also be used in protected cultivation, such as a tunnel or greenhouse, at a dilution rate of about 1 liter of fertilizer per 24 hours per a square meter during vegetation period. In hydroponics, 2 ml of plant growth and soil enhancement formulation maybe mixed in 1 liter of water. When vegetation is to grow for about 100 days, about 200 ml of plant growth and soil enhancement formulation in 100 liters of water may be applied per square meter.

Example 1A

| Compound | Amount |
| --- | --- |
| Organic Components | Up to about 80% by weight |
| At Least One Mineral Based Component | Up to about 20% by weight |
| Additional Components | As needed |

Example 1B

| Compound | Amount |
| --- | --- |
| Organic Materials | Up to about 80% by weight |
| At Least One Mineral Based Material | Up to about 20% by weight |
| At Least One Micro Element | As needed |
| Microorganism: One or More Species of Bacteria and/or Fungi | As needed |

Example 1C

| Compound | Amount |
| --- | --- |
| Organic Components | Up to about 80% by weight |
| At Least One Mineral Based Component Having Silicon | Up to about 20% by weight |
| Additional Components | As needed |

Example 2

| Compound | Amount |
| --- | --- |
| Organic Humus | About 30% to about 60% by weight |
| Organic Component | About 30% to about 60% by weight |
| Mineral Based Material: Bedrock/Geza | About 5% to about 20% by weight |

Example 3

| Compound | Amount |
| --- | --- |
| Organic Humus | About 50% by weight |
| Organic Component | About 40% by weight |
| Mineral Based Material: Geza | About 5% by weight |

Example 4

| Compound | Amount |
| --- | --- |
| Lignite | About 30% to about 60% by weight |

-continued

| Compound | Amount |
|---|---|
| Organic Component | About 30% to about 60% by weight |
| Mineral Based material: Geza | About 5% to about 20% by weight |

Example 5A

| Compound | Amount |
|---|---|
| Organic Humus | About 30% to about 60% by weight |
| Organic Component: One or More of Lignite, Humic Acid and/or Other HumicSubstances | About 30% to about 60% by weight |
| Mineral Based Material: Geza | About 5% to about 20% by weight |

Example 5B

| Compound | Amount |
|---|---|
| Organic Humus | About 30% to about 60% by weight |
| Organic Component: One or More of Lignite, Humic Acid | About 30% to about 60% by weight |
| Mineral Based Material: Geza | About 5% to about 20% by weight |
| At least One Microorganism | As needed |
| At least One Micronutrient | As needed |

Example 6A

| Compound | Amount |
|---|---|
| Organic Humus | About 30% to about 60% by weight |
| Organic Component: One or More of Lignite, Humic acid | About 30% to about 60% by weight |
| Mineral Based Material: One or More of Geza, Phyllosilicate Minerals, Kieserite, Beidellite | About 5% to about 20% by weight |

Example 6B

| Compound | Amount |
|---|---|
| Organic Humus | About 30% to about 60% by weight |
| One or More of Lignite, HumicAcid, and/or Other HumicSubstances | About 30% to about 60% by weight |
| One or More of Geza, Phyllosilicate Minerals, Kieserite, Beidellite | About 5% to about 20% by weight |
| At Least One Microelement | As needed |
| At Least One Microorganism | As needed |

Example 7A

| Compound | Amount |
|---|---|
| Organic Humus | About 30% to about 60% by weight |
| Organic Component: Lignite, Humic Acid | About 30% to about 60% by weight |
| Mineral Based Material: One or More of Geza, Kieserite | About 5% to about 20% by weight |
| Micro Elements: One or More of Iron, Manganese, Zinc, Copper, Boron, Molybdenum | As required |

Example 7B

| Compound | Amount |
|---|---|
| Organic Humus | About 30% to about 60% by weight |
| Lignite, Humic Acid, FulvicAcid | About 30% to about 60% by weight |
| One or More of Geza, Kieserite | About 5% to about 20% by weight |
| One or More of Iron, Manganese, Zinc, Copper, Boron, Molybdenum | As required |
| One or More Species of Bacteria or Fungi | As required |

Example 8A: Formulation for Application to High Temperature Environments Having Sand as Part of the Soil Structure, 1000 Liter

| Compound | Amount |
|---|---|
| Lignite (Brown Coal) | 140 grams |
| Geza Bedrock | 30 kg |
| KOH | 10 kg |
| Kiserite | 10 kg |
| Organic Substances | 500 liters |

Example 8A: Formulation for Application to High Temperature Environments Having Sand as Part of the Soil Structure, 1000 Liter

| Compound | Amount |
|---|---|
| Lignite (Brown Coal) | 280 grams |
| Geza Bedrock | 90 kg |
| KOH | 60 kg |
| Kiserite | 60 kg |
| Organic Substances | 50 liters |

Example 9A

To ground lignite (from KWB Belchatow, preferably of molecular size less than 5 mm) 1 Molar water solution of potash is added in the ratio of 1:1. To this mixture ?approximately 5-20% by weight, preferably 5%, Geza is added. The mineral rich bedrock is preferably crushed and minced to form particles of at or less than 0.05 mm. The composition is mixed for a period of time, from a few hours to overnight mixing, forming a wet but granulated volume (100 to 300 liters) of activated humus. The activated humus is spread using a fertilizer distributor in order to place over the soil area of 1 hectare. The activated humus is preferably mixed with top soil, resulting in a significant improvement of water retention and absorption, leading to larger crop yield. Preferably, the pH of the plant growth and soil enhancement formulation is less than 10.

Example 9B

Example 9A may further be supplemented with one or more of the following: additional mineral based materials such as but not limited to kieserite, humic acid, microorganisms such as saprophytic bacteria, or one or more micro elements, such as iron, manganese, zinc, copper, boron, molybdenum.

Example 10

To ground lignite, preferably having a molecular size of less than 5 mm, a 1 Molar water solution of potash is added in the ratio of 1:1. To this mixture, approximately 20% by volume of 40% aqueous Beidellite is added. The mixture is mixed for a period ranging from a few hours to overnight. A wet but granulated solution of activated humus is obtained and spread using a fertilizer distributor over the soil area of 1 hectare. The activated humus is preferably mixed with top soil, resulting in a significant improvement of water retention and absorption, leading to larger crop yields.

Example 11

Wet but loose granulated activated humus, like the one in Example 1, 9A/9B or 10 above, is mixed with dry, well composted greenery, manure or commercial farm mushroom bedding in a ratio of 1:1 to obtain a loose, granulated mix. The mix is distributed using a fertilizer spreader type at the dose of 200-3000 L per hectare. Administration of the mix results in significant soil improvement and higher crop yields in comparison to control (area with composted manure or mushroom growers bedding, but without activated humus).

Example 12

Wet but loose granulated activated humus, like the one in Examples 1, 9A/9B or 10 above, is transported to planting sites as an organic liquid fertilizer in a dose of 100-200 L per hectare, and is used with liquid manure on soil, mixed with top soil. This results in better soil water retention and absorption as well as an increase, by approximately 20%, of crops in comparison to control (area with manure only).

Example 13

Granulated, activated humus, described above, as for example, Examples 1, 9A/9B or 10, is diluted with water in the ratio of 1 volume part of humus to 5 parts of water, and mixed. After setting, a dark brown clear dilution of activated humus is decanted and used at the dose e.g. 50-200 L per hectare using, for example, an herbicide sprayer. The sediment that remains after decantation is transformed into a loose activated humus, which is applied using a fertilizer spreader, the same way as in Examples 1A-3, or using a liquid manure sprayer as in Example 4.

Example 14: Activated Humus with Lime

Wet but loose activated humus, such as for example as in Examples 1, 9A/9B or 10 is dry mixed with lignite ash (lignite ash obtained from the 2nd and 3rd zone of electro filters, e.g. from Patnow Power Plant) in the ratio of 1:1. The obtained granulated activated humus is spread using a fertilizer spreader or is sprayed using a liquid manure sprayer as described previously, at a dose of, for example, 300 L per hectare. The activated humus is preferably applied during various vegetation periods resulting to provide gradual soil de-acidification, improvement in water retention and absorption, as well as higher crops.

Example 15

One hundred (100) liters of the plant growth and soil enhancement formulation, as described in, for example, Examples 1, 9A/9B or 10, per 1 hectare is applied annually, about 20% applied to soil and 80% applied to leaves by sprayers or sprinklers in different stages of plant growth.

Example 16

Liquid humus, as in for example, Examples 1A-2 is mixed with fragmented bedrock and zeolite or with fragmented chalk, e.g. Ekocalcium, isolated from KBW Belchato in the ratio of 1:1, enriched in bio-humus or mycorrhizal inoculums. The granulated mixture obtained is applied at the dose of, for example, 100 to 200 L per hectare using, for example, a fertilizer spreader, or sprayed using a liquid manure sprayer. The mixture is preferably mixed with top soil or applied to deep levels of soil using a mechanical applicator having sub-soiling teeth.

Test Results: Live Crop Application

Application of the plant growth and soil enhancement formulation in accordance with the present invention, such as Example 1, to various types of plants was found to have direct affects on crop production and yield optimization. FIG. 1 illustrates graphical representation of various characteristics which show the affect of the application of the plant growth and soil enhancement formulation to live crops and some of the minimum benefits with respect to: A) chlorophyll content 10, showing a 10% increase in chlorophyll content of the Topaz Apple Tree; B) leaf surface area 12, showing a 30% increase in leaf surface of leafs of the Topaz Apple Tree, C) sucrose content 14, showing a 30% increase or more in sucrose content in Apples, Cherries, Sugarcane; D) tree height 16, showing a 38% increase in tree height growth in the Sabina Cherry Tree; E) tree diameter 18, showing a 45% increase in tree diameter growth in the Sabina Cherry Tree; F) fruit pieces 20, showing a 60% increase in fruit set pieces in the Ariwa Apple Tree; G) shoot growth 22 showing a 65% increase in the shoot growth in the Topaz Apple Tree; H) grain output 24, showing a 100% increase in grain output in rice plants; and I) flower growth 26, showing a 300% increase in corolla (flower) growth in the Topaz Apple Tree.

Additional Testing Methods: Various testing was performed to provide an assessment of the influence of the fertilization formulation in accordance with the present invention upon a variety of plants, measuring various parameters such as correct development of yielding parameters and stimulation of resistance of plants to pathogens.

The tests were performed within orchards located in Poland having various types of trees and/or plants, including several varieties of apple trees, several varieties of cherry trees, and strawberry plants. Several testing parameters were used, including observations of blooming stages, observations of fruiting, measurement of chlorophyll in leaves, measurement of crop volume and fruit quality, and measurement of tree size.

Table 1 illustrates several measured parameters for the Topaz Apple Tree in the presence and absence of the plant growth and soil enhancement formulation in accordance with the present invention. The measured parameters include Chlorophyll, tree size, blooming intensity, number of fruit set and crops.

TABLE 1

| Combination | Chlorophyll [fallen fruit] | PPPP [cm2] | Leaf area [cm2] | Blooming intensity | No. of fruits set [pcs] | Crop [kg] |
|---|---|---|---|---|---|---|
| Control-"0" | 47.88 | 7.86 | 31.15 | 9.00 | 21.13 | 2.26 |
| Control(NPK-nitrogen/phosphorous/potassium fertilizer) | 52.95 | 7.19 | 28.36 | 7.00 | 11.14 | 1.39 |
| plant growth and soil enhancement formulation | 50.70 | 7.86 | 36.74 | 9.00 | 14.25 | 2.46 |

Table 2 illustrates several additional measured parameters for the Topaz Apple Tree in the presence and absence of the plant growth and soil enhancement formulation in accordance with the present invention.

TABLE 2

| Treatment | Diameter [mm] | Height [cm] | The total of growth in the crown* [cm] | The total of growth [pcs] |
|---|---|---|---|---|
| No fertilization | 12.48 | 107.70 | 15.74 | 1.45 |
| NPK | 14.30 | 124.58 | 24.94 | 2.13 |
| Plant growth and soil enhancement formulation | 13.92 | 124.78 | 47.04 | 2.38 |

*shoots longer than 5 cm

Table 3 illustrates several measured parameters for the Ariwa apple tree in the presence and absence of the plant growth and soil enhancement formulation in accordance with the present invention. The measured parameters include Chlorophyll, tree size, blooming intensity, number of fruit set and crops.

TABLE 3

| Combination | Chlorophyll [fallen fruit] | PPPP [cm2] | Leaf area [cm2] | Blooming intensity | No. of fruit set [pcs] | Crop [kg] |
|---|---|---|---|---|---|---|
| Control "0" | 50.60 | 6.01 | 34.37 | 7.00 | 5.13 | 0.86 |
| Control(NPK) | 53.63 | 5.42 | 44.38 | 4.00 | 6.13 | 0.94 |
| Plant growth and soil enhancement formulation | 48.65 | 5.92 | 37.48 | 4.00 | 8.13 | 1.09 |

Table 4 illustrates several measured parameters for the Sabina Cherry Tree in the presence and absence of the plant growth and soil enhancement formulation in accordance with the present invention.

TABLE 4

| Treatment | Diameter [mm] | Height [cm] | The total of growth in the crown* [cm] | The total of growth [pcs] |
|---|---|---|---|---|
| No fertilization | 8.50 | 96.42 | 176.16 | 4.63 |
| NPK | 12.58 | 120.38 | 230.75 | 5.00 |
| Plant growth and soil enhancement formulation | 12.40 | 132.86 | 303.58 | 6.08 |

*shoots longer than 5 cm.

Tables 5, 6, and 7 illustrate the effects the plant growth and soil enhancement formulation in accordance with the present invention has on the growth rate of various fruiting trees.

Table 5 illustrates the influence of the use of plant growth and soil enhancement formulation on one-year growth of Sabina Cherry trees.

TABLE 5

| Combination | The total of one-year growth [m] | No. of growths [pcs.] | Average length of growth [cm] |
|---|---|---|---|
| Control-"0" | 8.16 | 40.50 | 22.30 |
| Control-(NPK) | 7.60 | 27.80 | 27.50 |
| Plant growth and soil enhancement formulation | 8.20 | 45.50 | 14.80 |

Table 6. Influence of use of plant growth and soil enhancement formulation on one-year growth of Topaz Cherry Trees.

TABLE 6

| Combination | The total of one-year growth [m] | No. of growths [pcs.] | Average length of growth [cm] |
|---|---|---|---|
| Control-"0" | 4.45 | 27.80 | 15.80 |
| Control-(NPK) | 3.54 | 23.30 | 14.90 |
| Plant growth and soil enhancement formulation | 5.03 | 32.80 | 15.10 |

Table 7. Influence of use of plant growth and soil enhancement formulation on one-year growth of Ariwa Apple Trees.

TABLE 7

| Combination | The total of one-year growth [m] | No. of growths [pcs.] | Average length of growth [cm] |
|---|---|---|---|
| Control-"0" (red) | 3.16 | 14.30 | 20.40 |
| Control-(NPK) (red) | 3.06 | 15.80 | 20.40 |

TABLE 7-continued

| Combination | The total of one-year growth [m] | No. of growths [pcs.] | Average length of growth [cm] |
|---|---|---|---|
| Plant growth and soil enhancement formulation | 2.78 | 20.50 | 14.10 |

Use of the plant growth and soil enhancement formulation in accordance with the present invention has also been found to have influence over various characteristics of plant roots, including increasing root area, volume, number of root tops, fresh root mass and mass of dried roots, and ability to fight off disease. Accordingly, the ability of the plant growth and soil enhancement formulation in accordance with the present invention to impact the growth of roots and the presence of arbuscularmycorrhizal fungi in the rhizosphere of strawberry species, such as *Elsanta, Elkat*, and *Honeoye*, in field conditions was measured. The tests were aimed at determination of influence of use of plant growth and soil enhancement formulation upon growth and settlement of strawberry plants by arbuscularmycorrhizal fungi. A degree of mycorrhizal frequency and the following parameters were determined in the plant roots: mycorrhizal frequency (F), relative mycorrhizal intensity (M), and absolute mycorrhizal intensity (m) according to Trouvelot's method, Trouvelot A, Kough J L, Gianinazzi-Pearson V (1986). Mesure du tauxdemycorhization VA d'un système radiculaire. Recherche des méthodesd'estimation ayant une signification fonctionnelle. In V. Gianinazzi-Pearson, S. Gianinazzi (Eds.). The mycorrhizae: physiology and genetics. INRA Press, Paris, France, pp. 217-221.

Figure 2:
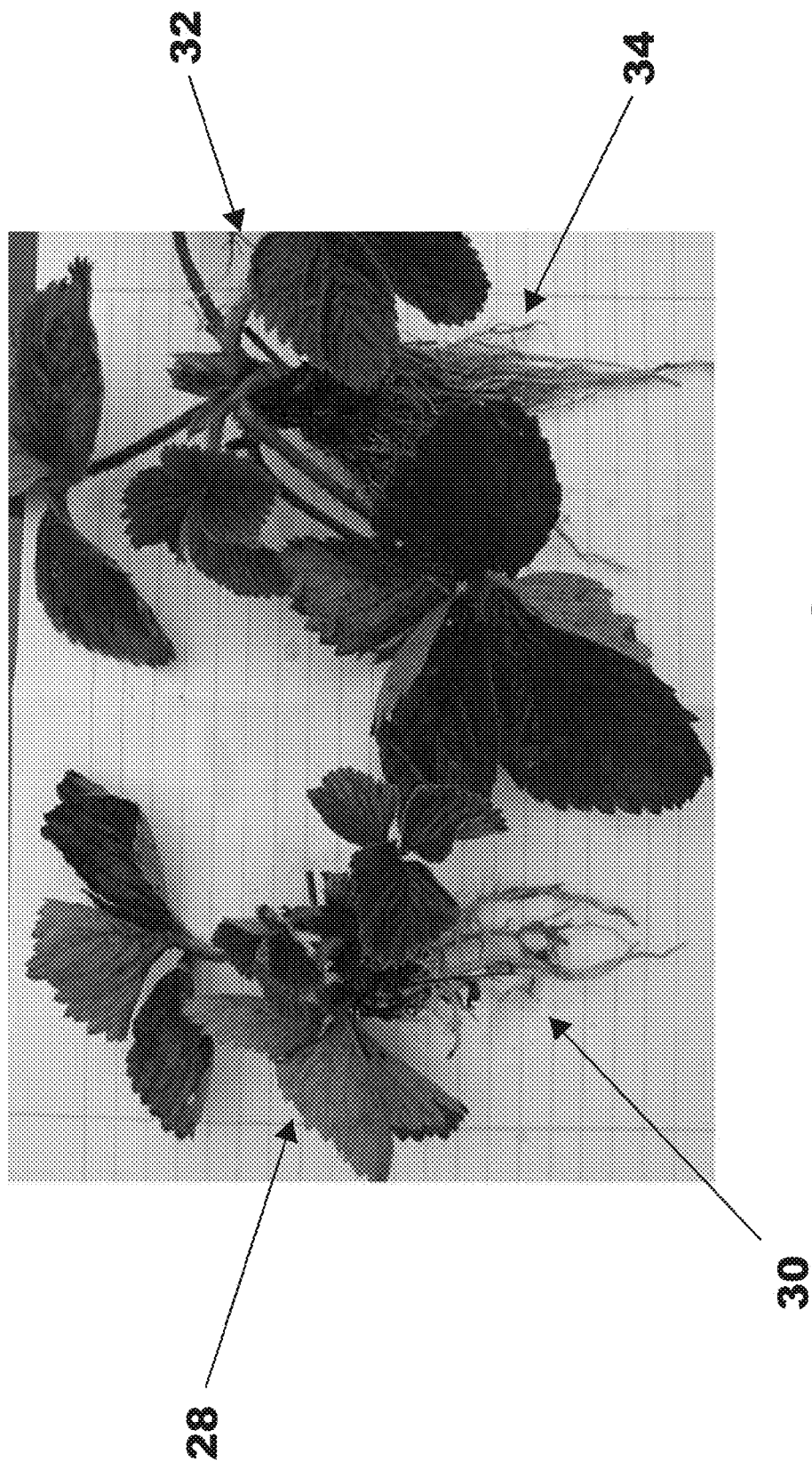
FIG. 2 illustrates the root system of strawberry plants grown with and without the use of the plant growth and soil enhancement formulation in accordance with the present invention.
Figure 4:
FIG. 4 illustrates the tomato plant shown in FIG. 3 after spraying with the plant growth and soil enhancement formulation in accordance with the present invention.
Figure 3:
FIG. 3 illustrates a tomato plant having traces of *Phytophthorainfestans*.
Figure 6:
Figure 5:
Figure 8:
Figure 7:
Figure 10:
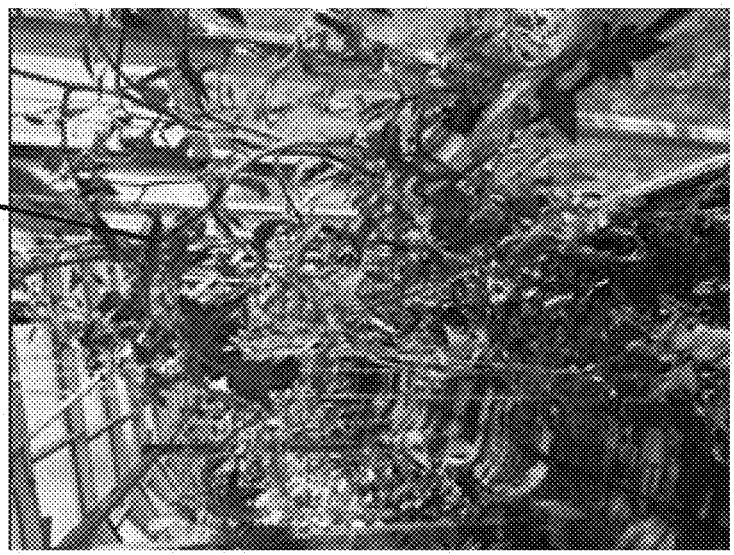
Figure 9:

Use of the plant growth and soil enhancement formulation has been shown to have a positive influence on the stimulation of plant root systems. Referring to FIG. 2, a control strawberry plant 28 with roots 30, i.e. grown without the presence of the plant growth and soil enhancement formulation is shown next to a strawberry plant 32 with roots 34 grown in the presence of the plant growth and soil enhancement formulation. The root system of the strawberry plant 32 seems to have greater numbers of roots 34 when compared to the number of roots 30 of the strawberry plant 28.

Tables 8, 9 and 10 illustrate the degree of mycorrhizal frequency and intensity in the roots of several varieties of strawberry plants: *Elsanta, Elkat*, and *Honeoye*.

Table 8: Degree of mycorrhizal frequency and intensity in the roots of *Elsanta*:

TABLE 8

| | Elsanta | | |
|---|---|---|---|
| Combination | F % | M % | m % |
| Control | 8.89 | 0.09 | 1.0 |
| NPK control | 4.44 | 0.04 | 1.0 |
| Plant growth and soil enhancement formulation | 22.22 | 0.47 | 1.83 |

Table 9: Degree of mycorrhizal frequency and intensity in the roots of *Elkat*:

TABLE 9

| | Elkat | | |
|---|---|---|---|
| Combination | F % | M % | m % |
| Control | 14.44 | 0.28 | 1.80 |
| NPK control | 6.67 | 0.58 | 2.33 |
| Plant growth and soil enhancement formulation | 23.33 | 0.63 | 2.71 |

Table 10: Degree of mycorrhizal frequency and intensity in the roots of *Honeoye*:

TABLE 10

| | Honeoye | | |
|---|---|---|---|
| Combination | F % | M % | m % |
| Control | 10.0 | 0.51 | 5.11 |
| NPK control | 7.78 | 0.08 | 1.0 |
| Plant growth and soil enhancement formulation | 24.44 | 0.51 | 2.15 |

Referring to FIGS. 3-10, the effectiveness of using the plant growth and soil enhancement formulation for fighting plant disease such as *Phytophthorainfestans* in tomato plants 36 is illustrated. In these examples, tomato plants stricken by *Phytophthorainfestans* were sprayed twice with 6% of the plant growth and soil enhancement formulation for a period of 4 days. Plants infected with the disease, see FIG. 3 or FIG. 6, were able to produce fruit after treatment, see FIGS. 4-5 and FIGS. 8-10.

Test Results: SugarCane Planting, combination of treatment with plant growth and soil enhancement formulation and soaking with the plant growth and soil enhancement formulation.

Application, including soaking, of the plant growth and soil enhancement formulation in accordance with the present invention, such as for example, Examples 1A-15, to sugarcane setts was shown to have a positive effect in comparison to sugarcane setts not treated with the plant growth and soil enhancement formulation. Forty (40) sugarcane setts were created from sugarcane stalks. Each sett contained two nodes (buds).

Treatment Group A: 20 setts, soaking treatment and spraying treatment. The setts were soaked for two hours in a plant growth and soil enhancement formulation (preferably 2% solution) and planted. The solution remaining after removal of the setts was applied to the furrow at planting. The planting schedule for non-treated sugarcane included:

Day 1: Plowing the field in one direction.

Day 2: Spraying plant growth and soil enhancement formulation (preferably a 12% solution) on the field.

Day 5-8: Plowing the same field perpendicular to the previous direction.

Day 13: Tilling the field with a disc harrow to create smaller granularity.

Day 14: Creating furrows (trenches) to place the setts in and spray the plant growth and soil enhancement formulation (preferably a 4% solution) in the furrows.

Day 15: Placing plant growth and soil enhancement formulation soaked (preferably a 2% solution) setts in the furrows, covering with soil.

Day 60: Spraying the plant growth and soil enhancement formulation (preferably a 4% solution) on the emerged plants.

Day 75: Weeding between rows as needed.

Day 90: Spraying the plant growth and soil enhancement formulation (preferably a 4% solution) on the growing plants.

Control Group B: 20 setts, no treatment. The planting schedule for non-treated sugarcane included:

Day 1: Plowing the field in one direction.

Day 5-8: Plowing the same field perpendicular to the previous direction.

Day 13: Tilling the field with a disc harrow to create smaller granularity.

Day 14: Creation of furrows (trenches) to place the sugarcane setts in.

Day 15: Placing sugarcane setts in the furrows and covering with soil.

Day 45 & 75: Weeding between rows as needed.

Figure 12:
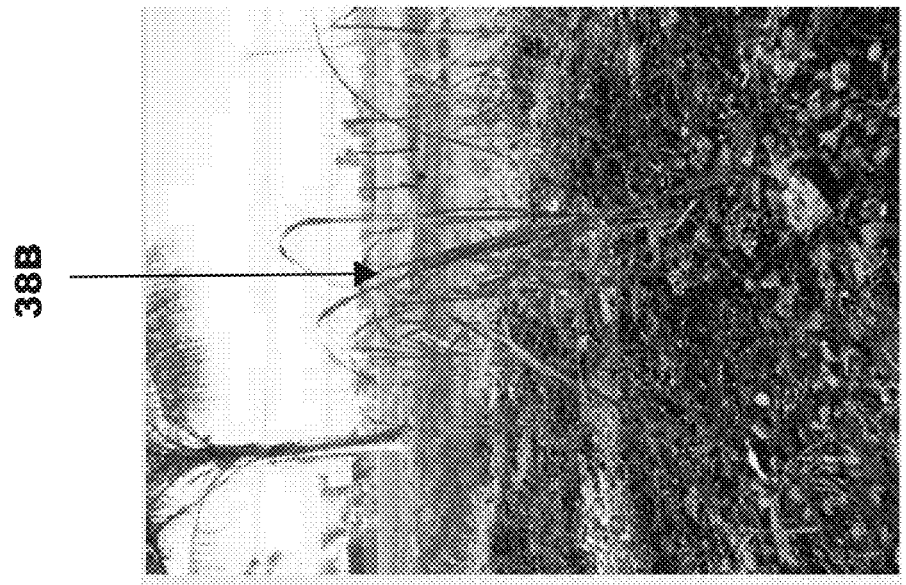
Figure 11:
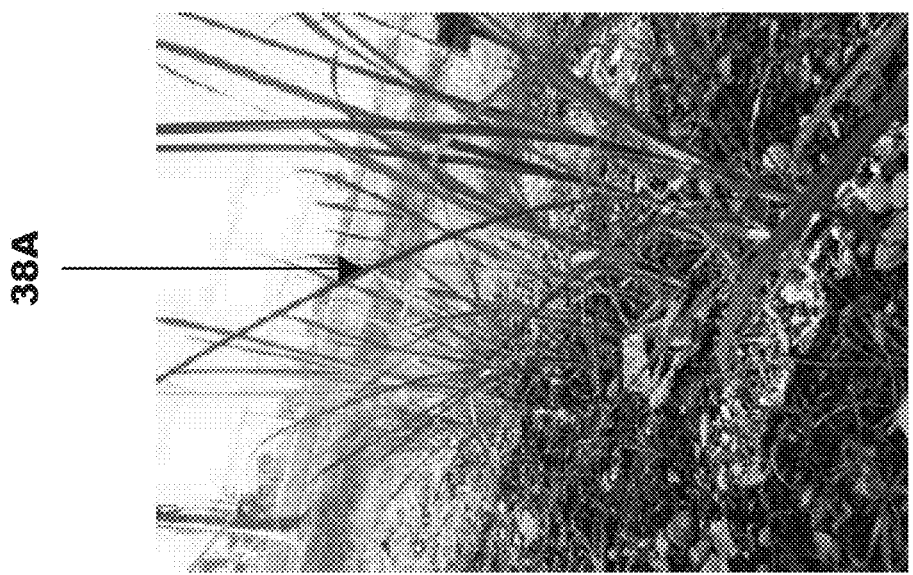

Table 11 illustrates the effects of soaking and treating sugarcane with the plant growth and soil enhancement formulation. As illustrated in the table, several measurable characteristics were improved in Treatment Group A, the soaked and treated group, when compared to Control Group B. The benefits of soaking and treating the sugarcane increased germination proliferation (150%), increased diameter of the plants (8.3%), days to plant emergence (33%), and size, i.e. taller plants (30%). FIG. 11 is a representative picture of soaked and treated sugarcane plants 38A. FIG. 12 a representative picture of untreated sugarcane plants 38B.

TABLE 11

Results of Soak Test on SugarCane Setts

|  | Group A | Group B |
|---|---|---|
| # of buds which germinated out of a maximum 40 possible | 34 | 16 |
| % of total possible which germinated | 85% | 40% |
| # of days to emerge (break the surface of ground) | 15 | 21 |
| Diameter (mm) of plants at base (sampling of 4 plants) | 45.05 | 43.0 |
|  | 44.7 | 39.8 |
|  | 45.1 | 43.1 |
|  | 44.9 | 40.1 |
| Avg. Diameter (mm) of plants at base | 44.94 | 41.5 |

Test Study 3: Pot experiment: soybeans, spring wheat, sweet potatoes, and rice. Field Experiment: potatoes, sugar beets and corn.

The results of the experiments indicated that the use of the plant growth and soil enhancement formulation increased all the tested plants considerably. The plant growth and soil enhancement formulation had the largest influence upon root crops such as sweet potato and sugar beet. The plant growth and soil enhancement formulation was shown to improve the quality of plants. Plants fertilized with the plant growth and soil enhancement formulation showed increased protein growth, increased sugar production, increases in fat (rapes), and an increase in the amount of starch in potatoes. The silicon contained in the plant growth and soil enhancement formulation was believed to play a role in the increased resistance of the plants to fungal diseases.

Basic studies were conducted on a lessive soil made of heavy loamy sand. Additionally, efficiency of the plant growth and soil enhancement formulation was tested in pot experiments on black earth made of light clay and on fen soil made of sandy clay loam. The experiment was carried out in 4 replicates. After sprouting, the crop stand was regulated leaving: 8 plants of spring wheat, 6 plants of soybeans, 4 plants of rice and 1 sweet potato plant. The growth and development of each type of plant was observed during vegetation. Fungal diseases (grey mold and wheat shoot diseases) occurring on plants in the pot experiment during vegetation were destroyed chemically.

After harvesting of winter wheat, a traditional plough cultivation of soil was applied. Directly before planting Sporta sugar beet, mineral fertilizers were sowed manually. 150 kg of potassium were used in the form of potash salt, 70 kg of phosphorus in the form of ammonium phosphate and 30 kg N/ha in the form of ammonium phosphate and 60 kg N/ha of urea were used. 60 kg of nitrogen in the form of ammonium nitrate was used as top dressing. In the vegetation period of sugar beet, weediness was destroyed.

On broadleaved weeds: Kontakttwin 191 EC, active substance: ethofumesate, phenmedipham/2 l/ha/2001 water 21 IV and Metafol 700 S.C., active substance: metamitron/1 l/ha/200 l water.

On monocotyledonous weeds: Leopard 05 EC, active substance: quizalofop-P-ethyl in dose: 1.20 l on 1 ha in 200 l water.

Insecticide: Bi 58 Nowy 400 EC, active substance: dimethoate in dose: 0.5 l on 1 ha in 200 l water.

Fungicides: against *cercospora* leaf spot: Yamato 303 SE, active substance: thiophanate-methyl, tetraconazole in dose: 1.25 l on 1 ha in 200 l water.

After harvesting of a winter wheat, a traditional plough cultivation of soil was applied. Directly before planting potatoes, mineral fertilizers were sowed manually. Hermes potatoes were planted using a two row planter, spacing of 75 cm. The space between seed-potatoes in a row was around 35 cm. In a vegetation period of potatoes, the following agricultural practices were applied:

|  | Agricultural Practices |
|---|---|
| Day 1 | Pre-sowing fertilization, potassium fertilizer, phosphorus 80 kg P2O5/hain the form of triple superphosphate, 140 kg of potassium in the form of potash salt and 80 kg N/ha in the form of urea |
| Day 9 | Planting of potato tubers dressed with Prestige |
| Day 28 | Covering of potatoes. Application of Linurex 500 SC herbicide in dose 2 l/ha |
| Day 42 | Top dressing with ammonium nitrate in dose 60 kg N/ha |
| Day 48 | Agricultural practices of chemical plant protection with preparations: PytonConsento 450 SC 2 l/ha |
| Day 69 | Agricultural practices of chemical plant protection with preparations: Infinito 687.5 SC in dose 2 l/ha |
| Day 90 | Agricultural practices of chemical plant protection with preparations: Tatoo C750 SC in dose 1.5 l/ha + Fury 100 EW in dose 0.1 l/ha |
| Day 97 | Desiccation with preparation Reglone Turbo 200 SL in dose 3 l/ha |
| Day 102 | Potato harvest |

Corn, variety Smolitop (FAO 230-240), was planted on 30 Apr. 2013 in the amount of around 100 thousand grains per 1 ha, spaced each at 75 cm. Before planting, ammonium phosphate was used in the amount of 200 kg/ha and potash salt in a dose of 120 kg $K_2O$/ha. Nitrogen fertilization in the form of ammonium nitrate was used also during vegetation period: at the stage of 4-6 leaves in the amount of 300 kg/ha and at the stage of paniculation in the amount of 100 kg per 1 ha. Weeding was carried out chemically using preparations of Click 500SC (1.5 l/ha)+ Guardian Max 840 EC (2.5 l/ha) and Bromotril as postemergent weed control. In vegetation period, Karate was used to fight pests. Samples of plants were taken at harvest time. The following were determined in plants: general nitrogen content with Kjeldahl method, potato starch content in potatoes, sugar content in sugar beets, fat content in rape. In addition, darkening of raw potato pulp was evaluated on their longitudinal section 10 minutes and 1 hour after slicing, based on 9° European scale. Evaluation of darkening of boiled potatoes was carried out separately for stolon part and in an apical part of a potato after 10 minutes and 2 hours after boiling, applying a 9° Danish grading scale.

Results: The following crop growth of potato tubers was obtained on every field fertilized with the plant growth and soil enhancement formulation compared to the control (Table 12). On average, the crop growth was 13% greater when treated. The highest yields of potato tubers were obtained using 2 formulation combinations: where potato tubers were dressed with the plant growth and soil enhancement formulation and where double spraying was applied at vegetation period, and on facility with four cycles of spraying of the plant growth and soil enhancement formulation. A greater effect was obtained when the potato tubers were dressed with the plant growth and soil enhancement formulation.

TABLE 12

Harvest and Quality of Potato Tubers

| Method of application of the plant growth and soil enhancement formulation | Harvest t/ha | Harvest growth % | % starch | Darkening of tubers raw | after boiling |
|---|---|---|---|---|---|
| 1. Control | 19.83 | | 20.5 | 8.0 | 7.8 |
| 2. Dressing of tubers and two cycles of plant sprays; | 22.43 | 13.1 | 20.9 | 8.2 | 7.7 |
| 3. Soil fertilization and two cycles of plant sprays; | 22.34 | 12.7 | 21.0 | 8.3 | 7.9 |
| 4. Four cycles of plant sprays; | 22.59 | 13.9 | 21.2 | 8.3 | 8.1 |
| 5. Dressing of tubers, soil fertilization and two cycles of plant sprays; | 22.23 | 12.1 | 21.0 | 8.5 | 8.0 |
| Average for plant growth and soil enhancement formulation. | 22.40 | 13.0 | 20.9 | 8.3 | 7.9 |

An increase of starch content in potato tubers was also recorded for each combination fertilized with the plant growth and soil enhancement formulation. The manner of the plant growth and soil enhancement formulation application had no influence on starch content. Additionally, the influence of the plant growth and soil enhancement formulation on output value of tubers (darkening) was evaluated. However, the examined variety had low susceptibility to darkening, therefore no influence of the plant growth and soil enhancement formulation application on this parameter was recorded. A higher average weight of a single tuber and greater participation in harvest of tubers with bigger diameter was observed for crops sprayed with the plant growth and soil enhancement formulation when compared to the control.

TABLE 13

The structure of potato harvest (weight of tubers under bushes and percentage of small, medium and large tubers)

| Method of application of plant growth and soil enhancement formulation | Tubers Weight | | % Tubers with ø | | |
|---|---|---|---|---|---|
| | Average of 1 tuber | From a bush g | <0.3 mm | 30-50 mm | >50 mm |
| 1. Control | 38.91 | 311.3 | 25.3 | 70.5 | 4.2 |
| 2. Dressing of tubers and two cycles of plant sprays; | 43.13 | 345.0 | 22.3 | 72.5 | 5.2 |
| 3. Soil fertilization and two cycles of plant sprays; | 42.19 | 337.5 | 23.8 | 69.7 | 6.5 |
| 4. Four cycles of plant sprays; | 43.44 | 347.5 | 21.5 | 71.3 | 7.2 |
| 5. Dressing of tubers, soil fertilization and two cycles of plant sprays; | 42.75 | 342.0 | 22.0 | 71.0 | 7.0 |
| Average for the plant growth and soil enhancement formulation | 42.88 | 343.0 | 22.4 | 71.2 | 6.4 |

Sugar beets: A significant increase in harvest was recorded for both roots and leaves of sugar beets on fields fertilized with plant growth and soil enhancement formulation in comparison to the control (Table 14). The greatest growth of harvest was obtained using combination number 5 with soil-applied plant growth and soil enhancement formulation and foliage-spraying. However, the difference between other manners of the plant growth and soil enhancement formulation application was statistically negligible. Roots of sugar beets fertilized with the plant growth and soil enhancement formulation had a higher content of sugar (Table 14). This effect additionally increases sugar crops which is the basis for valuation of this crop.

TABLE 14

Sugar beet crop and sugar content in roots

| Method of application of the plant growth and soil enhancement formulation | Crop in t/ha | | | Crop growth in % | |
|---|---|---|---|---|---|
| | root | leaves | % sugar | root | leaves |
| 1. Control | 59.2 | 27.6 | 18.1 | | |
| 2. Dressing of tubers and two cycles of plant sprays; | 68.37 | 31.48 | 19.1 | 15.5 | 14.05 |
| 3. Soil fertilization and two cycles of plant sprays; | 70.06 | 30.64 | 19.3 | 18.3 | 11.01 |
| 4. Four cycles of plant sprays; | 69.31 | 31.48 | 19.4 | 17.1 | 14.05 |
| 5. Dressing of tubers, soil fertilization and two cycles of plant sprays; | 70.81 | 31.90 | 19.6 | 19.6 | 15.5 |

TABLE 14-continued

Sugar beet crop and sugar content in roots

| Method of application of the plant growth and soil enhancement formulation | Crop in t/ha | | | Crop growth in % | |
|---|---|---|---|---|---|
| | root | leaves | % sugar | root | leaves |
| Average for the plant growth and soil enhancement formulation | 69.60 | 31.38 | 19.3 | 17.6 | 13.66 |

Corn, field experiment: Similar to the potatoes and sugar beets, a significant growth of crops was obtained of both grain and straw in combinations using the plant growth and soil enhancement formulation in comparison to the control (Table 15). The crops on fields fertilized more intensively with the plant growth and soil enhancement formulation were slightly higher than using combinations with double application of the plant growth and soil enhancement formulation. However, these differences were insignificant, which shows that in field experiments it is enough to apply the plant growth and soil enhancement formulation once before sowing (planting) and a double spraying during vegetation period. Unlike in the case of potatoes, a more productive use was soil-application prior to emergence of plants. Use of the plant growth and soil enhancement formulation resulted in an increase in the weight of corn grains. Enhanced protein content in corn grains fertilized with the plant growth and soil enhancement formulation was recorded. The greatest increase of protein content was obtained on plants with four cycles of spraying.

TABLE 15

Corn crop on light soil, protein content and weight of 1000 grains (MTZ) field experiment.

| Method of application of the plant growth and soil enhancement formulation. | Crop in g/pot | | | % protein in the grain | Crop growth in % | |
|---|---|---|---|---|---|---|
| | grain | straw | MTZ | | grain | straw |
| 1. Control | 7.14 | 14.85 | 241 | 8.18 | | |
| 2. Dressing of grain and two cycles of plant sprays; | 7.82 | 16.43 | 249 | 8.51 | 9.6 | 10.6 |
| 3. Soil fertilization and two cycles of plant sprays; | 8.00 | 16.11 | 252 | 8.42 | 12.1 | 8.5 |
| 4. Four cycles of plant sprays; | 8.10 | 16.20 | 254 | 8.59 | 13.5 | 9.1 |
| 5. Dressing of grain, soil fertilization and two cycles of plant sprays; | 8.14 | 17.10 | 256 | 8.49 | 14.0 | 15.2 |
| Average for the plant growth and soil enhancement formulation. | 8.01 | 16.46 | 252 | 8.50 | 12.3 | 10.8 |

Spring rape, micro-plot experiment. Spring rape was cultivated in a micro-plot experiment on heavy soil. Spring rape fertilized with the plant growth and soil enhancement formulation increased the crop of grains, the straw of the rape, and the fat content in seeds (Table 16). Differences depending on the manner of fertilizer application were insignificant.

TABLE 16

Crop of spring rape and fat content in seeds

| Method of application of theplant growth and soil enhancement formulation | Crop in g/pot | | | Crop growth in % | |
|---|---|---|---|---|---|
| | grain | straw | % fat | grain | straw |
| 1. Control | 52.8 | 114.3 | 42.9 | | |
| 2. Dressing of grain and two cycles of plant sprays; | 62.85 | 132.07 | 44.8 | 19.03 | 15.5 |
| 3. Soil fertilization and two cycles of plant sprays; | 63.80 | 134.51 | 45.0 | 20.84 | 17.7 |
| 4. Four cycles of plant sprays; | 63.44 | 133.91 | 44.2 | 20.20 | 17.2 |
| 5. Dressing of grain, soil fertilization and two cycles of plant sprays; | 64.13 | 135.4 | 44.9 | 21.46 | 18.5 |
| Average for the plant growth and soil enhancement formulation. | 63.60 | 134.02 | 44.73 | 20.40 | 17.2 |

Soybeans, pot experiment. As in the case of rape crop, the use of the plant growth and soil enhancement formulation on soybeans increased both soybean grains and straw (Table 17). Better effects of the plant growth and soil enhancement formulation were obtained when more doses were used (see No. 4 and No. 5) compared to double application. This follows from the fact that soybeans gain crop weight at later stages of vegetation. As with other species, these differences were statistically insignificant. A greater weight of 1000 grains of soybeans was obtained where this fertilizer was used compared to the control. The plant growth and soil enhancement formulation also increased protein content in grains. The largest increase was obtained with the crops fertilized with the plant growth and soil enhancement formulation method of using four spraying periods. Soybean plants fertilized with plant growth and soil enhancement formulation have shown a greater immunity to fungal diseases.

TABLE 17

Soybeans crop, protein content in seeds and weight of 1000 soybean seeds 1000 (MTZ)

| Method of application of the plant growth and soil enhancement formulation ion | Crop in g/pot | | MTZ g | Protein % | Crop growth in % | |
|---|---|---|---|---|---|---|
| | grain | straw | | | grain | straw |
| 1. Control | 6.74 | 8.20 | 108.1 | 34.24 | | |
| 2. Dressing of grain and two cycles of plant sprays; | 7.71 | 9.44 | 116.3 | 35.54 | 14.4 | 15.1 |
| 3. Soil fertilization and two cycles of plant sprays; | 7.87 | 9.44 | 121.1 | 35.67 | 16.8 | 15.1 |
| 4. Four cycles of plant sprays; | 8.09 | 9.65 | 122.9 | 36.78 | 20.0 | 17.7 |
| 5. Dressing of grain, soil fertilization and two cycles of plant sprays; | 8.19 | 9.68 | 123.8 | 36.75 | 21.5 | 18.0 |

TABLE 17-continued

Soybeans crop, protein content in seeds and
weight of 1000 soybean seeds 1000 (MTZ)

| Method of application of the plant growth and soil enhancement formulation ion | Crop in g/pot | | MTZ | Protein | Crop growth in % | |
|---|---|---|---|---|---|---|
| | grain | straw | g | % | grain | straw |
| Average for the plant growth and soil enhancement formulation | 7.97 | 9.55 | 121.0 | 36.19 | 18.2 | 16.5 |

Spring wheat, pot experiments. Spring wheat was grown in light and heavy soil (Tables 18 and 19). In both soils, the crops obtained considerable growth of grain and straw crops when used with the plant growth and soil enhancement formulation fertilizer. However, the growth of the grain crop as a result of the use of the plant growth and soil enhancement formulation was approx. 10% higher from the heavy soil as compared to the light soil. As far as the light soil with lower fertility is concerned, appropriate nutrition of plants plays a greater role, and the very stimulation gives lower production effects. The favourable influence of using the plant growth and soil enhancement formulation upon wheat crops resulted in improvement of rigidity of wheat stems. This can be significant, especially in field conditions.

For pot experiments, favourable influence of the plant growth and soil enhancement formulation was also obtained per the weight of wheat grains. Similar to the crops, the weight of wheat grains in the heavy soil was approx. 10 grams higher than in the light soil. The contents of protein in wheat grains also depended on fertilization with the use of the tested fertilizer. Objects fertilized with the plant growth and soil enhancement formulation were shown to have higher protein content than in cases of control objects. A cycle of four sprays had the best effect for protein contents. The protein contents in the heavy soil were lower than in the light soil.

TABLE 18

Spring wheat crops in the light soil, protein
contents and weight of 1000 seeds (MTZ)

| Method of application of the plant growth and soil enhancement formulation | Crop in g/pot | | MTZ | Protein content % | Crop growth in % | |
|---|---|---|---|---|---|---|
| | grain | straw | | | grain | straw |
| 1. Control | 21.48 | 32.90 | 46.1 | 19.41 | | |
| 2. Dressing of tubers and two cycles of plant sprays; | 23.74 | 35.60 | 48.3 | 20.06 | 10.5 | 8.2 |
| 3. Soil fertilization and two cycles of plant sprays; | 23.90 | 36.40 | 48.4 | 20.22 | 11.3 | 10.6 |
| 4. Four cycles of plant sprays; | 24.12 | 36.60 | 48.9 | 20.69 | 12.3 | 11.2 |
| 5. Dressing of grain, soil fertilization and two cycles of plant sprays; | 25.20 | 37.10 | 49.1 | 20.38 | 17.3 | 12.8 |
| Average for the plant growth and soil enhancement formulation | 24.24 | 36.43 | 48.7 | 20.34 | 12.8 | 10.7 |

TABLE 19

Spring wheat crops in the heavy soil, %
protein and weight of 1000 seeds (MTZ)

| Method of application of the plant growth and soil enhancement formulation | Crops in g/pot | | MTZ | % protein in grain | Crop growth in % | |
|---|---|---|---|---|---|---|
| | grain | straw | | | grain | straw |
| 1. Control | 32.4 | 34.1 | 54.2 | 18.14 | | |
| 2. Dressing of grain and two cycles of plant sprays; | 38.91 | 39.6 | 56.63 | 18.85 | 20.1 | 16.1 |
| 3. Soil fertilization and two cycles of plant sprays; | 40.49 | 40.7 | 57.17 | 18.57 | 25.0 | 19.4 |
| 4. Four cycles of plant sprays; | 40.69 | 40.9 | 60.19 | 19.06 | 25.6 | 20.0 |
| 5. Dressing of grain, soil fertilization and two cycles of plant sprays; | 41.15 | 41.3 | 60.8 | 19.11 | 27.0 | 21.2 |
| Average for the plant growth and soil enhancement formulation | 40.3 | 40.6 | 58.7 | 18.90 | 24.4 | 19.2 |

Corn, micro-plot experiments. Apart from the field experiments conducted in light soil, corn was grown as part of micro-plot experiments in heavy soil and medium humus soil (Table 20). From those soils, the crops obtained much greater efficiency when using the plant growth and soil enhancement formulation in the light soil. Crop growth from the medium soil was 50% higher than from the light soil and 75% higher than from the heavy soil. Crops such as corn grains and straw from the heavy soil, which were grown in the same conditions and fertilized in the same way, had higher (crop yields than from the medium soil. This confirms observations made during pot experiments with wheat, where effectiveness of the plant growth and soil enhancement formulation in the heavy soil was also much higher than from the light soil. From the medium soil, the crops had obtained growth, where the plant growth and soil enhancement formulation was used four times (no. 4 and 5) as compared to two times (no. 2 and 3). For the heavy soil differences between particular methods of application of the fertilizer were very small

TABLE 20

Corn crops in medium and heavy soil.

| Method of application of the plant growth and soil enhancement formulation | Medium soil | | | | Heavy soil | | | |
|---|---|---|---|---|---|---|---|---|
| | Crops in g/pot | | Crop growth in % | | Crops in g/pot | | Crop growth in % | |
| | grain | straw | grain | straw | grain | straw | grain | straw |
| 1. Control | 390 | 850 | | | 470 | 1100 | | |
| 2. Dressing of tubers and two cycles of plant sprays; | 455 | 1000 | 16.7 | 17.6 | 570 | 1300 | 21.3 | 18.2 |
| 3. Soil fertilization and two cycles of plant sprays; | 445 | 975 | 14.1 | 14.7 | 590 | 1270 | 25.5 | 15.5 |
| 4. Four cycles of plant sprays; | 465 | 1022 | 19.2 | 20.2 | 580 | 1380 | 23.4 | 25.5 |

TABLE 20-continued

Corn crops in medium and heavy soil.

| Method of application of the plant growth and soil enhancement formulation | Medium soil | | | | Heavy soil | | | |
|---|---|---|---|---|---|---|---|---|
| | Crops in g/pot | | Crop growth in % | | Crops in g/pot | | Crop growth in % | |
| | grain | straw | grain | straw | grain | straw | grain | straw |
| 5. Dressing of tubers, soil fertilization and two cycles of plant sprays; | 472 | 1037 | 21.0 | 22.0 | 585 | 1400 | 24.5 | 27.3 |
| Average for the plant growth and soil enhancement formulation | 459 | 1009 | 17.8 | 18.6 | 581 | 1338 | 23.7 | 21.6 |

Sweet Potato, pot experiments. Use of the plant growth and soil enhancement formulation on sweet potato plants provided considerable growth of the tuber crops as compared to control crops (Table 21). Similar to the field experiments with potatoes, the influence of the plant growth and soil enhancement formulation was better for preparation of the tubers than fertilization of the soil following plant sprouting. Little favourable influence of the plant growth and soil enhancement formulation with the use of the fertilizer upon contents of dry mass and protein in sweet potato tubers was found. The little influence of the plant growth and soil enhancement formulation upon protein contents results from the fact that the potato tubers contain relatively little protein and the least contents of protein as compared to all the tested plants. Soil fertilization with the plant growth and soil enhancement formulation had the most favourable influence upon dry mass contents, whereas spray fertilization had the most favourable influence upon protein contents.

TABLE 21

Sweet potato crops and contents of dry mass and protein in sweet potato tubers.

| Method of application of the plant growth and soil enhancement formulation | Crops in g/pot | Dry weight content | % protein | Crop growth in % |
|---|---|---|---|---|
| 1. Control | 149.24 | 29.0 | 1.66 | |
| 2. Dressing of tubers and two cycles of plant sprays; | 172.24 | 28.9 | 1.70 | 15.4 |
| 3. Soil fertilization and two cycles of plant sprays; | 174.99 | 29.7 | 1.65 | 17.3 |
| 4. Four cycles of plant sprays; | 171.90 | 29.1 | 1.73 | 15.2 |
| 5. Dressing of grain, soil fertilization and two cycles of plant sprays; | 175.30 | 30.3 | 1.71 | 17.5 |
| Average for the plant growth and soil enhancement formulation | 173.6 | 29.5 | 1.70 | 16.0 |

Rice, pot experiments. Rice fertilized with the plant growth and soil enhancement formulation was affected the most as compared to the tested plants as part of pot experiments. Rice crops obtained from 4 plants were one and a half times higher than spring wheat crops obtained from 8 plants (Table 22). This indicates a high production potential of the plant. Similar to other plants, the rice plants obtained considerable growth of rice crops as a result of fertilization with the plant growth and soil enhancement formulation in relation to the control combination. Influence of the plant growth and soil enhancement formulation caused a slight delay in rice ripening (increased the period of vegetation). This phenomenon was observed, in particular, using method combination 4, where the plant growth and soil enhancement formulation was used four times.

TABLE 22

Rice crops in light soil-pot experiments

| Method of application of the plant growth and soil enhancement formulation | Crops in g/pot | | Crop growth in % | |
|---|---|---|---|---|
| | grain | straw | grain | straw |
| 1. Control | 30.02 | 57.04 | | |
| 2. Dressing of grain and two cycles of plant sprays; | 34.67 | 69.34 | 15.5 | 21.6 |
| 3. Soil fertilization and two cycles of plant sprays; | 34.37 | 70.80 | 14.5 | 24.1 |
| 4. Four cycles of plant sprays; | 33.74 | 73.89 | 12.4 | 29.5 |
| 5. Dressing of grain, soil fertilization and two cycles of plant sprays; | 33.99 | 70.02 | 13.2 | 22.8 |
| Average for the plant growth and soil enhancement formulation | 34.19 | 71.01 | 13.9 | 24.5 |

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention, which are obvious to those skilled in the art, are intended to be within the scope of the following claims.

What is claimed is:

1. A plant growth and soil enhancement formulation comprising organic humus colloid having a particle size of 0.5 microns to 5.0 microns; a silica-calcite sedimentary rock material; saprophytic bacteria; at least one micro element or one macro element essential for plant growth; and at least one humic substance comprising humic acid or fulvic acid.

2. The plant growth and soil enhancement formulation according to claim 1 wherein said silica-calcite material is Geza.

3. The plant growth and soil enhancement formulation according to claim 1 wherein said humus comprises particles in the size of between 1 to 3 microns.

4. The plant growth and soil enhancement formulation according to claim 1 wherein said at least one humic substance is humic acid, fulvic acid, or combinations thereof.

5. A plant growth and soil enhancement formulation comprising:

humus colloid having particle size of 1.0 to 3.0 microns at a concentration of between 30% and 60% total weight of said formulation;

silica-calcite sedimentary rock material at a concentration of between 5% to 20% total weight of said formulation; and humic acid, fulvic acid, or combinations thereof at a concentration of between 30% and 60% total weight of said formulation.

6. The plant growth and soil enhancement formulation according to claim 5 wherein said silica-calcite material is particles of at or less than 0.05 mm.

7. A method of enhancing soil growth comprising applying a plant growth and soil enhancement formulation comprising at least organic humus colloid having a particle size of 1.0 to 3.0 microns at a concentration of between 30% and 60% total weight of said formulation, a silica-calcite sedimentary rock material at a concentration of between 5% to 20% total weight of said formulation, saprophytic bacteria, at least one micro element or one macro element essential for plant growth; and at least one humic substance at a concentration of between 30% and 60% total weight of said formulation, to an area of land.

8. The method of enhancing soil growth according to claim 7 wherein said silica-calcite material is Geza.

9. The method of enhancing soil growth according to claim 8 wherein a concentration of Geza is between 5% and 20% total weight of said formulation.

* * * * *